United States Patent
Tsujino et al.

Patent Number: 5,715,111
Date of Patent: Feb. 3, 1998

[54] TAPE TENSION CONTROL CIRCUIT THAT OPENS TAKE-UP REEL TENSION FEEDBACK LOOP DURING CAPSTAN-FREE OPERATION

[75] Inventors: Yukihiko Tsujino; Hiromi Hoshino; Yoshiaki Haba; Yasuo Nagai; Hiroshi Saito, all of Kanagawa, Japan

[73] Assignee: Sony Corporation, Tokyo, Japan

[21] Appl. No.: 965,726

[22] Filed: Oct. 23, 1992

[30] Foreign Application Priority Data

Oct. 30, 1991 [JP] Japan ..................... 3-285126

[51] Int. Cl.$^6$ ..................................... G11B 15/43
[52] U.S. Cl. .............................. 360/71; 242/334.6
[58] Field of Search ..................... 360/74.3, 73.04, 360/73.08, 73.09, 73.11, 73.14, 71, 73.05, 73.06; 242/186, 205, 334.6, 334.1, 412.2

[56] References Cited

U.S. PATENT DOCUMENTS 4,318,140  3/1982  Shigeta ................... 360/73.08 X
4,341,363  7/1982  Inatome .................. 360/73.04 X
4,649,441  3/1987  Louth .................... 360/73.14 X
5,222,684  6/1993  Yoneda et al. ................. 242/186

Primary Examiner—Thang V. Tran
Assistant Examiner—James L. Habermehl
Attorney, Agent, or Firm—Limbach & Limbach L.L.P.

[57] ABSTRACT

A tape tension controlling circuit which eliminates a complicated controlling operation and is produced at a very low cost. A supply side tape tension regulator is provided on the supply reel side while a take-up side tape tension regulator is provided on the take-up reel side with reference to a rotary drum, and displacements of the regulators corresponding to tension values of the magnetic tape are fed back to reel controlling systems for the supply reel and the take-up reel so that the tape tension on the supply reel side and the tape tension on the take-up reel side are individually kept constant. When the magnetic tape is to be fed in a pinch-off condition wherein a pinch roller is spaced away from the magnetic tape, a take-up side tension error signal is inhibited from being supplied.

4 Claims, 3 Drawing Sheets

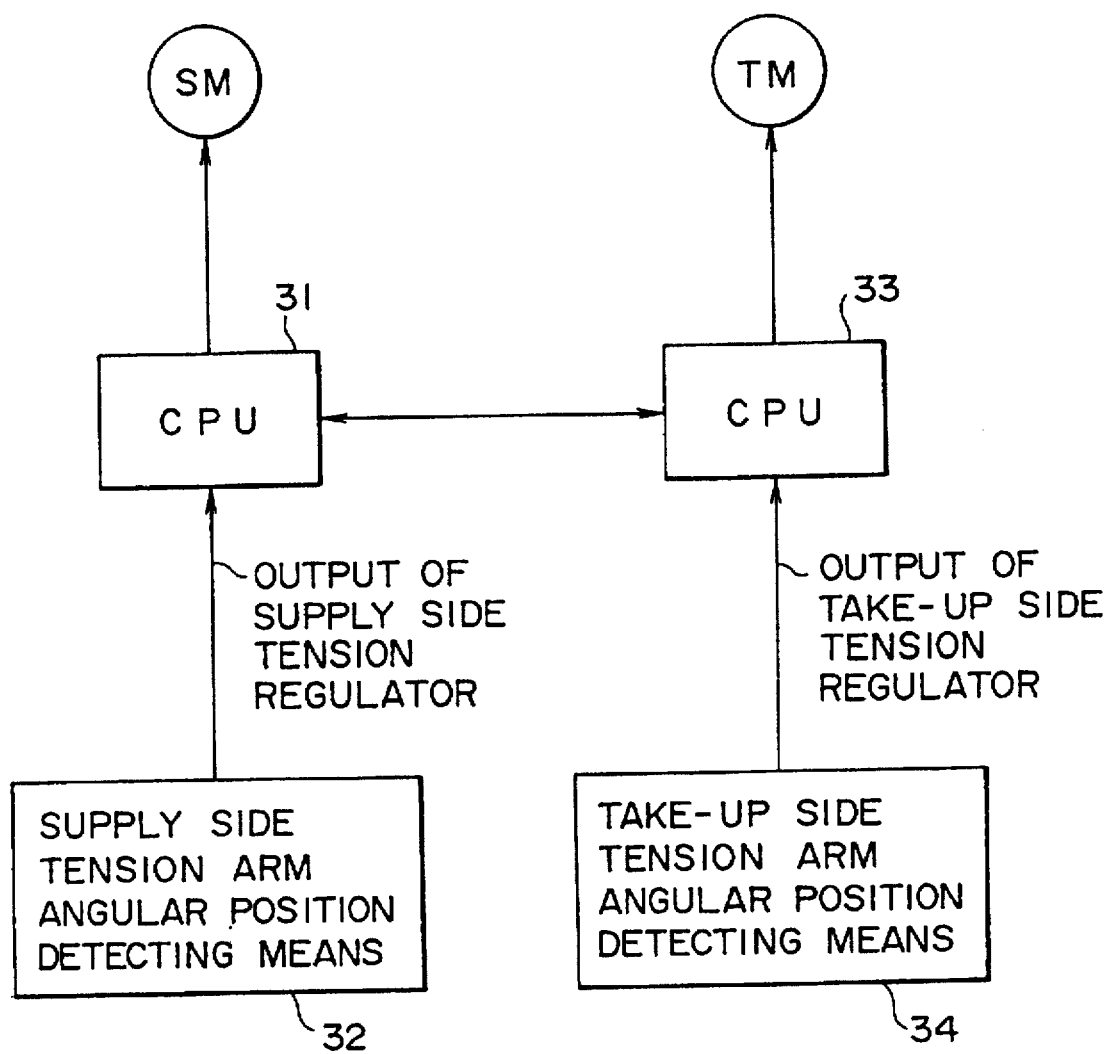

TAPE TENSION CONTROL CIRCUIT THAT OPENS TAKE-UP REEL TENSION FEEDBACK LOOP DURING CAPSTAN-FREE OPERATION

BACKGROUND OF THE INVENTION

1. Field of the Invention

This invention relates to a tape tension controlling circuit Suitable for use with a digital video tape recorder or a like apparatus.

2. Description of the Related Art

Digital video tape recorders for business use are normally designed to allow, in an editing operation or a like operation, selection of an arbitrary tape feeding speed in accordance with an object of the editing in order to feed a magnetic tape at a high speed or at a moderate speed lower than a predetermined playing speed.

In an ordinary video tape recorder, a regulator for the tape tension is provided only on the tape supply side in order to take up an otherwise possible slack of a magnetic tape even in such a variable speed reproducing mode as described above. The output of the regulator is fed back to a driving controlling system, which is provided on the supply reel side and often constituted from a microcomputer, so that the tension of the tape on the tape supply side may always be constant.

In order to perform an editing or like operation efficiently, the follow-up property of the tape feeding speed to an operation of the user must necessarily be rapid. This is because, for example, in a variable mode (VAR mode) in which a dial (not shown) provided on an operation board is manually operated to vary the tape feeding speed from the −1 time speed to the double or 2 time speed or in a jog mode in which the dial is manually operated to vary the tape feeding speed from the −3 time speed to the +3 time speed, if a tape feeding speed instructed is not reached rapidly, then this will lead to a loss of the editing time.

If the responsiveness of the tape feeding speed is enhanced in order to eliminate the problem, then a slack of the magnetic tape sometimes appears in the tape feeding system from a capstan motor to a take-up reel in a particular region of the tape feeding speed in a particular operation mode.

In order to take up such a slack of a magnetic tape as described just above, in some conventional video tape recorders, another regulator for the tape tension similar to that on the supply reel side is provided also in the tape feeding system from a capstan motor to a take-up reel.

An exemplary one of conventional tape feeding apparatus for a digital video tape recorder of the type just mentioned is shown in FIG. 2. Referring to FIG. 2, the tape feeding apparatus shown includes a rotary drum 1, a supply reel 3S and a take-up reel 3T. A magnetic tape 4 is drawn out from a tape cassette 2 and follows such a tape path as seen in FIG. 2 until it is wrapped around the rotary drum 1. The magnetic tape 4 then passes from the rotary drum 1 along such a tape path as seen in FIG. 2 and is wound onto the take-up reel 3T.

In order to make up the tape paths, a plurality of guide posts (fixed guides and roller guides) 5 to 10 are disposed in the tape feeding systems and a plurality of movable guides 11 to 14 are disposed on a tape loading mechanism for wrapping the magnetic tape 4 over a predetermined angular range around the rotary drum 1. The tape feeding apparatus further includes, on the take-up reel 3T side, a capstan 15 for driving the magnetic tape 4 and a pinch roller 16 for selectively pressing against the capstan 15 with the magnetic tape 4 held therebetween.

A regulator 20S for keeping the tension of the magnetic tape 4 on the supply reel 3S side constant is provided at a predetermined position of the tape feeding system on the supply reel 3S side. The regulator 20S, which will be hereinafter referred to as supply side regulator 20S, includes a tension arm 22 supported for pivotal motion around a fulcrum 21a, a tape guide 23 mounted at the other end portion of the tension arm 22, and a spring 24 for normally biasing the tension arm in the counterclockwise direction. The tension arm 22 includes detecting means 32 (refer to FIG. 3) for detecting an angular position of the tension arm 22.

Since the angular position of the tension arm 22 is a function of the magnitude of the tension of the magnetic tape 4 then, the angular position detecting means 32 outputs an output (regulator output) the magnitude of which increases in proportion to an amount of variation of the tension of the magnetic tape 4. The regulator output is supplied to a supply reel side controlling system to control, for example, a supply reel driving motor SM (FIG. 3) so that the tape tension is kept constant irrespective of a variation of the speed of the magnetic tape 4.

Another regulator 20T is provided at a predetermined position of the tape feeding system on the take-up reel 3T side for keeping the tension of the magnetic tape 4 on the take-up reel 3T side constant. The regulator 20T, which will be hereinafter referred to as take-up aide regulator 20T, includes a tension arm 25 supported for pivotal motion around a fulcrum 25a, a tape guide 26 mounted at the other end portion of the tension arm 25, and a spring 27 for normally biasing the tension arm 25 in the counterclockwise direction.

Also the tension arm 25 includes detecting means 34 (refer to FIG. 3) for detecting an angular position of the tension arm 25. Thus, the tension of the magnetic tape 4 is detected by a similar operation of the detecting means 34, and a regulator output obtained then is fed back to a controlling system on the take-up reel side to control a take-up reel driving motor TM (FIG. 3) so that the tape tension is kept constant irrespective of a variation of the speed of the magnetic tape 4.

In this manner, the tension of the magnetic tape 4 on the supply reel 3S side with reference to the rotary drum 1 is kept constant by the supply side regulator 20S while the tension of the magnetic tape 4 on the take-up reel 3T side is kept constant by the take-up side regulator 20T.

The supply side regulator 20S and the take-up side regulator 20T described above are constructed so that they operate in any operation mode of the digital video tape recorder.

In particular, the two regulators 20S and 20T operate simultaneously not only in a jog mode and a variable mode described hereinabove (in which modes the pinch roller 16 is pressed against the capstan 15 so that the magnetic tape 4 between them is fed by the capstan 15 (called pinch-on condition)) but also a shuttle mode in which the tape speed can be varied, by manual turning operation of the dial, from the −50 time speed to the +50 time speed in proportion to the speed of the turning movement of the dial and the pinch roller 16 is spaced away from the capstan 15 so that the magnetic tape 4 can be fed at a high speed (called pinch-off condition).

To this end, the tape tension controlling circuit 30 is in most cases constructed in such a manner as shown in FIG.

3. Referring to FIG. 3, regulator outputs delivered from the angular position detecting means 32 and 34 are supplied to correcting controlling systems 31 and 33, respectively, which may each be constituted from a CPU (central processing unit). The correcting controlling systems 31 and 33 thus produce and supply predetermined motor driving signals to the corresponding driving motors SM and TM, respectively, so as to individually control the tension of the magnetic tape 4.

By the way, when the magnetic tape 4 is fed in a pinch-on condition, it is held between the capstan 15 and the pinch roller 16, and consequently, the tape feeding system on the supply reel 3S side and the tape feeding system on the take-up reel 3T side with reference to the point at which the magnetic tape 4 is held are completely separate from each other. Consequently, a result of control of the tape tension on the supply reel 3S side does not have an influence on the tape tension on the take-up reel 3T side. This signifies that the tape tension on either side can be controlled independently.

On the other hand, in a pinch-off condition, the magnetic tape 4 is not held between the capstan 15 and the pinch roller 16, and consequently, the tape feeding systems from the supply reel 3S to the take-up reel 3T must be considered as a single tape feeding system. Thus, a result of control of the tape tension on the supply reel 3S side has an influence on the tape tension on the take-up reel 3T side.

In a shuttle mode described above, if, for example, it is tried to increase the tape tension on the supply reel 3S side, then also the tape tension on the take-up reel 3T side must be increased. Further, if speed control is added, then, particularly upon acceleration or deceleration of the magnetic tape 4, the tape tension must be controlled not only on the take-up reel side 3T but synthetically taking an influence from the supply reel 3S side and so forth into consideration. To this end, data must be transmitted between the CPUs 31 and 33 as seen from FIG. 3.

As a result, control programs loaded in the CPUs 31 and 33 are complicated and circuit configuration for the transmission of data is complicated. Besides., the CPUs 31 and 33 must operate at a high speed accordingly. Those factors increase the production cost.

SUMMARY OF THE INVENTION

It is an object of the present invention to provide a tape tension controlling circuit which eliminates a complicated controlling operation and is produced at a very low cost.

In order to attain the object, according to the present invention, there is provided a tape tension controlling circuit for a tape feeding apparatus which feeds a magnetic tape from a supply reel to a take-up reel past a rotary drum along a predetermined path and includes a normally rotating capstan and a pinch roller movable to an operative position at which the pinch roller is pressed against the capstan with the magnetic tape interposed therebetween to cause the magnetic tape to be fed by the capstan, comprising a first tape tension regulator provided on the supply reel side of the magnetic tape with reference to the rotary drum for detecting tension of the magnetic tape on the supply reel side, a second tape tension regulator provided on the take-up reel side of the magnetic tape with reference to the rotary drum for detecting tension of the magnetic tape on the take-up reel side, a first driving controlling system for controlling a drive motor for the supply reel, a second driving controlling system for controlling a drive motor for the take-up reel, first and second feedback means for feeding back tension values from the first and second tape tension regulators to the first and second driving controlling systems to cause the first and second tape tension regulators control the tension of the magnetic tape on the supply reel side and the take-up reel side so as to be constant, respectively, and inhibiting means operative when the pinch roller is not at the operative position in which the magnetic tape is fed freely by the motor for the supply reel or the take-up reel for inhibiting the tension value detected by the second feedback means from being supplied to both the first and the second driving controlling systems.

Preferably, the second feedback means includes reference tension generating means for generating a reference tension value in accordance with an external instruction signal, and comparison means for comparing a tension value from the second tape tension regulator with the reference tension value from the reference tension generating means to produce a difference signal, the inhibiting means inhibiting the difference signal from the comparison means .from being supplied to the second driving controlling system. Preferably, the inhibiting means includes gain means for determining a feedback gain in response to a position of the pinch roller and producing, when the pinch roller is not at the operative position, a feedback gain signal representing that the feedback gain is equal to zero, and the second feedback means further includes feedback gain controlling means for amplifying a difference signal from the comparison means by the feedback gain determined by the gain means. Preferably, the tape tension controlling circuit further comprises acceleration detecting means for detecting an acceleration or deceleration of the magnetic tape being fed, torque generating means for generating a torque value from the acceleration or deceleration from the acceleration detecting means, a reference tension value from the reference tension generating means and an externally supplied variable parameter, and means for adding an amplified difference signal from the feedback gain controlling means to the torque value from the torque generating means and supplying a resulted signal to the second driving controlling system.

With the tape tension controlling circuit, in a tape feeding mode in which a pinch-on condition wherein the pinch roller is at the operative position is involved, both of the first and second tape tension regulators operate, and the drive motors for the supply and take-up reels are control-led in response to tension values outputted from the first and second tape tension regulators and representing magnitudes of the tension of the magnetic tape on the supply reel side and the take-up reel side, respectively, so that the tension of the magnetic tape is kept constant. Accordingly, in this instance, a reference tension value and an acceleration or deceleration are supplied from the reference tension generating means and the acceleration detecting means, respectively, to the torque generating means, and a predetermined feedback gain is supplied from the gain means to the feedback gain controlling means.

On the other hand, in another tape feeding mode in which a pinch-off condition wherein the pinch roller is not at the operative position is involved, the tape tension control circuit controls so that only the first tape tension regulator operates. Accordingly, the reference tension value to be supplied to, the torque generating means is controlled to be equal to zero, and also the feedback gain to be supplied to the feedback gain controlling means is controlled to be equal to zero. Consequently, the second tape tension regulator on the take-up reel side is controlled so that it does not substantially operate. In this condition, control of the tape tension is effected only by the first tape tension regulator on the supply side.

In this manner, in a tape feeding mode in which a pinch-off condition is involved such as a shuttle mode, the second tape tension regulator on the take-up side is controlled so that it does not operate.

Accordingly, with the tape tension controlling circuit, a step of calculating a reference tension and a feedback gain in a tape feeding mode in which a pinch-off condition is involved can be omitted, and consequently, the scale of the control program can be reduced as much. Further, since, in a pinch-off condition, transmission of control data between the supply side and the take-up side is unnecessary, a circuit system otherwise necessary for the transmission is omitted and the circuit scale can be reduced. Further, although, when the tape tension is controlled while data is transmitted between the supply side and the take-up side, a controlling system which operates at a high speed must necessarily be prepared, with the tape tension controlling apparatus of the present invention, to control the tape tension by a controlling system which operates at a comparatively low speed, and consequently, a considerable reduction in production cost can be achieved.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 3 is a block diagram showing an exemplary conventional tape tension controlling circuit.

DETAILED DESCRIPTION OF THE PREFERRED EMBODIMENT

A description is subsequently given of a preferred embodiment of the present invention in which a tape tension controlling circuit is applied to a digital video tape recorder of the type described hereinabove.

Figure 2:
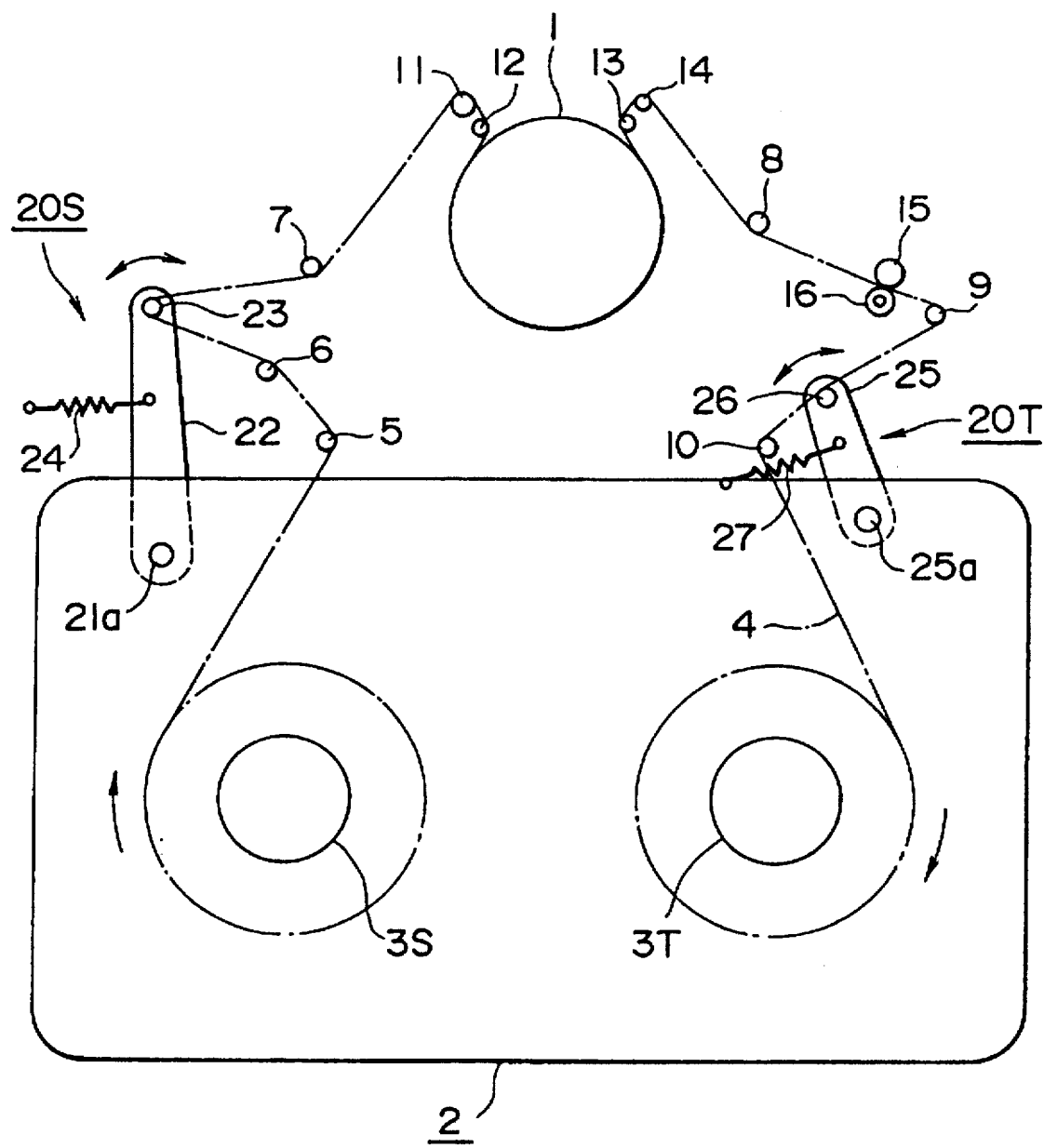
FIG. 2 is a tape feeding apparatus to which the tape tension controlling circuit of FIG. 1 is applied.

The digital tape recorder includes such a tape feeding apparatus as described hereinabove with reference to FIG. 2, and the tape tension controlling circuit according to the present invention has such a basic controlling system as described hereinabove with reference to FIG. 3. Thus, in any tape feeding mode in which a pinch-on condition is involved, both of the supply side regulator 20S and the take-up side regulator 20T operate so that the driving motors SM and TM are controlled in accordance with regulator outputs corresponding to tape tension values obtained from the regulators 20S and 20T to control the tape tension constant.

On the other hand, in any tape feeding mode in which a pinch-off condition is involved, the regulators 20S and 20T are controlled so that only the supply side regulator 20S operates. Accordingly, the take-up side regulator 20T acts as a mere damper, and transmission data between the CPUs 31 and 33 is not performed regarding a tape tension controlling mode.

Figure 1:
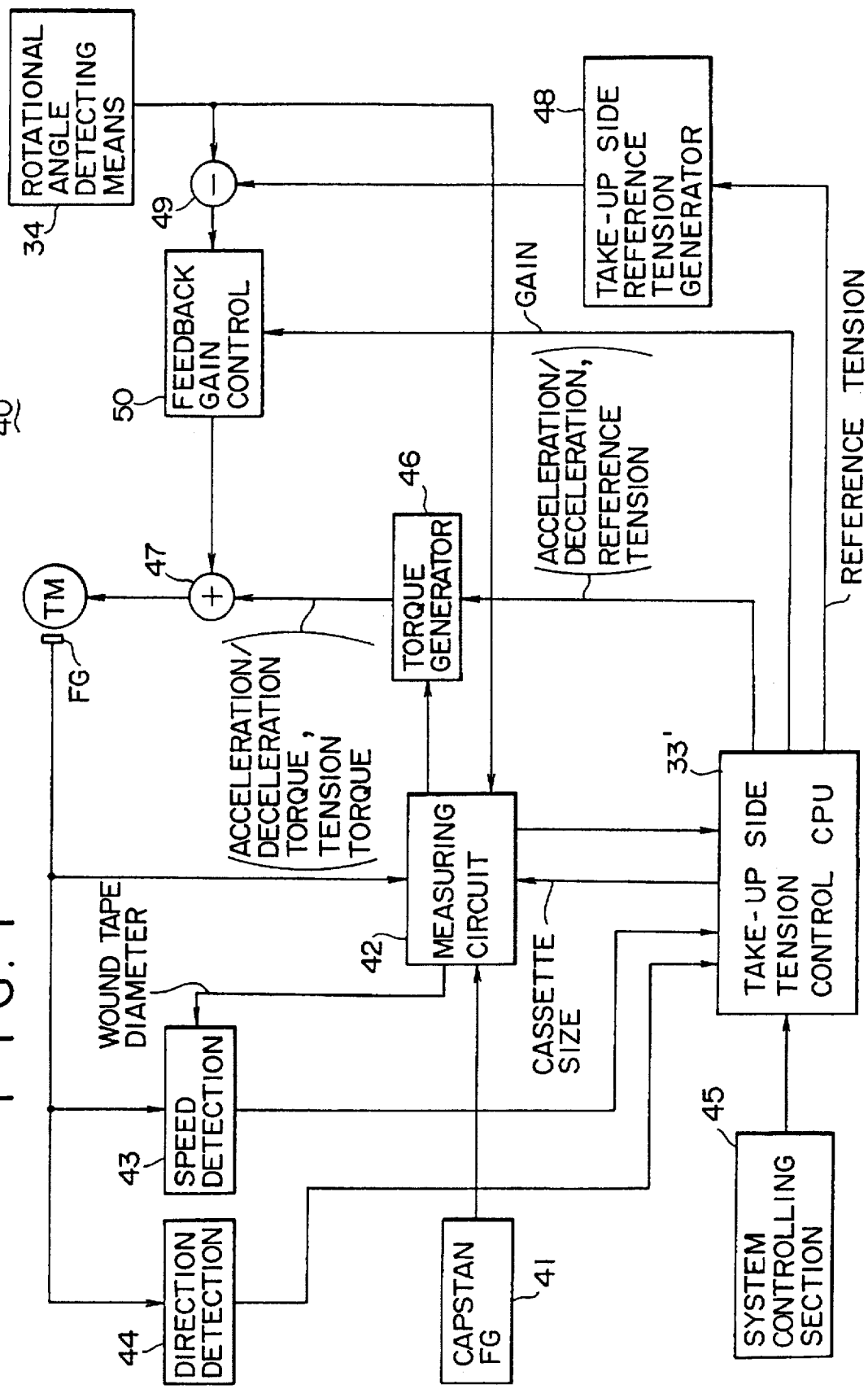
FIG. 1 is a block diagram of a tape tension controlling circuit showing a preferred embodiment of the present invention.

Referring to FIG. 1, there is shown a take-up side tape tension controlling circuit to which the present invention is applied. The take-up side tape tension controlling circuit is generally denoted at 40 and is included in the CPU 33 shown in FIG. 3.

The take-up side tape tension controlling circuit 40 includes a measuring circuit 42 for measuring a diameter of the magnetic tape 4 wound on the take-up reel 3T and a value of inertia of the take-up reel 3T. To this end, two FG outputs are supplied to the measuring circuit 42. In particular, a frequency generator FG is provided for the take-up reel driving motor TM and delivers an FG output the frequency of which increases in proportion to the speed of rotation of the take-up reel driving motor TM. The other FG output is supplied from another frequency generator 41 provided for the capstan 15. The latter FG output may alternatively be a timer roller pulse produced from a timer roller. The measuring circuit 42 calculates a wound tape diameter from the FG outputs thus received.

The take-up side tape tension controlling circuit 40 further includes a rotational speed detecting circuit 43 which calculates a speed of rotation of the take-up side reel motor TM from an FG output of the frequency generator FG for the take-up reel driving motor TM and a wound tape diameter from the measuring circuit 42. The take-up side tape tension controlling circuit 40 further includes a tape feeding direction detecting circuit 44 for detecting a tape feeding direction from a direction of rotation from the frequency generator FG for the take-up reel driving motor TM. Data of a wound tape diameter, an inertia value, a speed of rotation and a tape feeding direction of the take-up reel 3T are supplied to a CPU 33' for the take-up side tape tension control, which thus produces various information for the take-up side driving motor TM (for example, information of an indication of a reference value of tension corresponding to a tape cassette used).

Command information (speed designating information) corresponding to an operation of the operation board is produced by a system controlling section 45. The speed designating information is supplied to the CPU 33' together with information of a size of the tape cassette used so that it is used for the production of control information described above by the CPU 33'.

The control information includes, in addition to reference tension indicating information mentioned above, information of an acceleration or deceleration, a feedback gain and so forth. The reference tension indicating information is supplied to a take-up reel side reference tension generator 48, from which a reference tension value conforming to the tape cassette used is outputted. The reference tension value is supplied together with a measured tension value (take-up side regulator output) produced from the rotational angle detecting means 34 to a subtractor 49, at which a difference between them is calculated.

The variation of tension, that is, an error component, is supplied to a feedback gain controlling circuit 50, at which it is amplified by an amount corresponding to a gain received from the CPU 33'. The thus amplified output is supplied to an adder 47.

Meanwhile, a torque generator 46 calculates a torque value for the tape tension and another torque value for the acceleration or deceleration in accordance with data of a reference tension value and an acceleration or deceleration from the CPU-33' and data of a wound tape diameter and an inertia value Calculated by the measuring circuit 42. In short, a torque value for the tape tension is calculated in accordance with the wound tape diameter multiplied by the reference tension value while another torque value for the acceleration or deceleration is calculated from in accordance with inertia value multiplied by the acceleration.

The outputs of the torque values and the feedback gain are added to each other at the adder and applied as a torque controlling signal to the take-up side driving motor TM. Since control of the driving torque of the driving motor TM varies the tension of the magnetic tape 4 in the tape winding direction, the take-up side tape tension can be controlled to a predetermined value in accordance with the torque controlling signal.

Accordingly, in a tape feeding mode in which a pinch-on condition is involved, the tape tension controlling circuit 40 operates irrespective of the tape feeding speed so that such tape tension control as described above is performed. On the other hand, in a tape feeding mode in which a pinch-off condition is involved such as a shuttle mode, the CPU 33' discriminates the tape feeding mode and controls the gain to zero. As a result, the output of the feedback gain controller 50 is reduced to zero, and consequently the tape tension control is inhibited. As a result, the take-up side regulator 20T operates as a mere damper.

Incidentally, in a pinch-on condition, a torque value for the acceleration or deceleration is calculated from an error component of the tape tension obtained from the supply side regulator 20S and a speed error component obtained from the speed detecting circuit 4 and the take-up side driving motor TM is controlled in accordance with the torque value thus calculated.

In a pinch-off condition, since the controlling operation of the take-up side regulator 20T is inhibited, the CPU 33' can omit the calculating steps for calculating a reference tension value and a gain, and consequently, the scale of the control program can be reduced as much. In a pinch-off condition, since transmission of control data between the CPUs 33 and 31 shown in FIG. 3 is unnecessary, the circuit system necessary for the transmission is eliminated, and consequently, the circuit scale can be reduced. When the tape tension is controlled while data is transmitted between the supply side and the take-up side, a controlling system which operates at a high speed must necessarily be prepared. However, with the construction of the present embodiment, control of the tape tension can be effected by a controlling system which operates at a comparatively low speed, and consequently, a considerable reduction in production cost can be achieved.

Having now fully described the invention, it will be apparent to one of ordinary skill in the art that many changes and modifications can be made thereto without departing from the spirit and scope of the invention as set forth herein.

What is claimed is:

1. A tape tension controlling circuit for a tape feeding apparatus which feeds a magnetic tape from a supply reel to a take-up reel past a rotary drum along a predetermined path and includes a normally rotating capstan and a pinch roller movable to an operative position at which the pinch roller is pressed against the capstan with the magnetic tape interposed therebetween to cause the magnetic tape to be fed by the capstan, comprising:

a first tape tension detector provided on the supply reel side of the magnetic tape with reference to the rotary drum for detecting tension of the magnetic tape on the supply reel side;

a second tape tension detector provided on the take-up reel side of the magnetic tape with reference to the rotary drum for detecting tension of the magnetic tape on the take-up reel side;

a first driving controlling system for controlling a drive motor for the supply reel;

a second driving controlling system for controlling a drive motor for the take-up reel;

first feedback means and second feedback means for feeding back tension values from the first tape tension detector and the second tape tension detector to the first driving controlling system and the second driving controlling system to cause the first tape tension detector and the second tape tension detector to control the tension of the magnetic tape on the supply reel side and the take-up reel side, respectively, so as to be constant; and inhibiting means operative when the pinch roller is not at the operative position in which the magnetic tape is fed freely by the motor for the supply reel or the take-up reel for inhibiting the tension value detected by the second tape tension detector from being supplied to both the first driving controlling system and the second driving controlling system.

2. A tape tension controlling circuit according to claim 1, wherein the second feedback means includes reference tension generating means for generating a reference tension value in accordance with an external instruction signal, and comparison means for comparing a tension value from the second tape tension detector with the reference tension value from the reference tension generating means to produce a difference signal, and wherein the inhibiting means inhibits the difference signal from the comparison means from being supplied to the second driving controlling system.

3. A tape tension controlling circuit according to claim 2, wherein the inhibiting means includes gain control means for determining a feedback gain in response to a position of the pinch roller and producing, when the pinch roller is not at the operative position, a feedback gain control signal representing that the feedback gain is equal to zero, and the second feedback means further includes feedback gain controlling means responsive to the feedback gain control signal for amplifying a difference signal from the comparison means by a feedback gain determined by the feedback gain control signal.

4. A tape tension controlling circuit according to claim 3, further comprising acceleration detecting means for detecting an acceleration or deceleration of the magnetic tape being fed, torque generating means for generating a torque value from the acceleration or deceleration from the acceleration detecting means, a reference tension value from the reference tension generating means and an externally supplied variable parameter, and means for adding an amplified difference signal from the feedback gain controlling means to the torque value from the torque generating means and supplying a resulting signal to the second driving controlling system.

* * * * *